US009693299B2

(12) United States Patent
Doppler et al.

(10) Patent No.: US 9,693,299 B2
(45) Date of Patent: Jun. 27, 2017

(54) METHOD AND APPARATUS FOR POWER SAVING OPERATIONS IN WIRELESS NETWORK ELEMENTS

(75) Inventors: Klaus Franz Doppler, Espoo (FI); Jarkko Lauri Sakari Kneckt, Espoo (FI); Juha Sakari Korhonen, Espoo (FI); Cassio Barboza Ribeiro, Espoo (FI)

(73) Assignee: NOKIA TECHNOLOGY OY, Espoo (FI)

( * ) Notice: Subject to any disclaimer, the term of this patent is extended or adjusted under 35 U.S.C. 154(b) by 796 days.

(21) Appl. No.: 12/627,103

(22) Filed: Nov. 30, 2009

(65) Prior Publication Data

US 2011/0128865 A1 Jun. 2, 2011

(51) Int. Cl.
| | |
|---|---|
| *H04W 52/02* | (2009.01) |
| *H04W 76/04* | (2009.01) |
| *H04W 48/12* | (2009.01) |
| *H04W 88/08* | (2009.01) |
| *H04W 72/12* | (2009.01) |
| *H04W 36/00* | (2009.01) |

(52) U.S. Cl.
CPC ..... *H04W 52/0206* (2013.01); *H04W 76/048* (2013.01); *H04W 36/0088* (2013.01); *H04W 48/12* (2013.01); *H04W 72/12* (2013.01); *H04W 88/08* (2013.01); *Y02B 60/50* (2013.01)

(58) Field of Classification Search
CPC ........... H04W 76/048; H04W 52/0206; H04W 52/0216
USPC ......................................................... 370/311
See application file for complete search history.

(56) References Cited

U.S. PATENT DOCUMENTS

| | | | |
|---|---|---|---|
| 6,584,330 | B1 | 6/2003 | Ruuska |
| 7,068,623 | B1 | 6/2006 | Barany et al. |
| 7,586,949 | B1 | 9/2009 | Barany et al. |
| 2005/0154933 | A1 | 7/2005 | Hsu et al. |
| 2006/0029011 | A1 | 2/2006 | Etemad et al. |
| 2006/0089161 | A1 | 4/2006 | Kim et al. |
| 2006/0268800 | A1* | 11/2006 | Sugaya et al. ................ 370/338 |
| 2007/0066273 | A1 | 3/2007 | Laroia et al. |

(Continued)

FOREIGN PATENT DOCUMENTS

| | | |
|---|---|---|
| CN | 1741640 A | 3/2006 |
| CN | 101170726 A | 4/2008 |

(Continued)

OTHER PUBLICATIONS

S.-R. Yang and Y.-B. Lin. "Modeling UMTS Discontinuous Reception Mechanism," IEEE Transactions on Wireless Communications, vol. 4, No. 1, pp. 312-319, Jan. 2005.*

(Continued)

*Primary Examiner* — Omer S Mian
(74) *Attorney, Agent, or Firm* — Squire Patton Boggs (US) LLP

(57) ABSTRACT

In accordance with an example embodiment of the present invention, a method comprises determining at a base station an activity level, and selecting an availability mode based at least in part on the activity level, wherein the availability mode is one of a full-availability mode, a semi-availability mode and a minimum-availability mode. The method also comprises configuring radio resources for at least the minimum-availability mode and switching to the selected availability mode.

12 Claims, 8 Drawing Sheets

(56) References Cited

U.S. PATENT DOCUMENTS

| | | | |
|---|---|---|---|
| 2008/0181127 A1* | 7/2008 | Terry et al. | 370/252 |
| 2009/0034443 A1 | 2/2009 | Walker et al. | |
| 2009/0046641 A1 | 2/2009 | Wang et al. | |
| 2009/0092056 A1 | 4/2009 | Kitazoe | |
| 2009/0238098 A1 | 9/2009 | Cai et al. | |
| 2010/0002610 A1* | 1/2010 | Bowser et al. | 370/311 |
| 2010/0118797 A1 | 5/2010 | Park et al. | |
| 2010/0272037 A1* | 10/2010 | Lee et al. | 370/329 |
| 2010/0284316 A1* | 11/2010 | Sampathkumar | 370/311 |
| 2011/0039499 A1* | 2/2011 | Zhang et al. | 455/67.11 |
| 2011/0244792 A1* | 10/2011 | Park et al. | 455/39 |

FOREIGN PATENT DOCUMENTS

| | | | |
|---|---|---|---|
| CN | 101179825 A | 5/2008 | |
| CN | 101296495 A | 10/2008 | |
| WO | 2005120178 A2 | 12/2005 | |
| WO | 2007082934 | 7/2007 | |
| WO | 2008/084938 A1 | 7/2008 | |
| WO | 2008083463 | 7/2008 | |
| WO | 2008/111823 A1 | 9/2008 | |
| WO | 2008134614 | 11/2008 | |

OTHER PUBLICATIONS

International Search Report and Written Opinion, received in corresponding Patent Cooperation Treaty Application No. PCT/IB2010/055236. Dated Mar. 25, 2011. 15 pages.

Office Action dated May 26, 2014, issued in corresponding Chinese Application No. 201080049429.X.

3GPP TSG-RAN WG1 #59, R1-095011 "Extended cell DTX for enhanced energy-efficient network operation" Ericsson, ST-Ericsson, Nov. 9-13, 2009 (6 pages).

Office Action dated Aug. 11, 2015, issued in corresponding CN Application No. 201080049429.X (with English translation).

Office Action dated Feb. 9, 2015, issued in corresponding CN Patent Application No. 201080049429.X (with English translation).

Supplementary European Search Report Issued in corresponding EP Application No. 10832729.7, dated Oct. 6, 2016.

Farbod et al. "Resource Allocation and Outage Control for Solar-Powered WLAN Mesh Networks", XP011186230, IEEE Transactions on Mobile Computing vol. 6, No. 8. Aug. 1, 2007. pp. 960-970.

Huawei Technologies, "Add energy savings activation/deactivation specification level requirements to TR 32.826", 3GPP TSG-SA5 Meeting SA5 #68, S5-094327, XP050645624, Nov. 13, 2009. pp. 1-2.

Supplementary European Search Report issued in corresponding EP Application No. 10832729.7, dated Nov. 17, 2016.

Nokia Corporation et al. "Time to Trigger and DRX co-operation in E-UTRAN". 3GPP TSG-RAN WG2 Meeting #64, R2-087185, Nov. 10-14, 2008. pp. 1-5.

Office Action dated Jan. 28, 2016, issued in corresponding Vietnamese patent application No. 1-2012-00536 (with English translation).

* cited by examiner

METHOD AND APPARATUS FOR POWER SAVING OPERATIONS IN WIRELESS NETWORK ELEMENTS

TECHNICAL FIELD

The present application relates generally to a method and apparatus for power saving operations in wireless network elements.

BACKGROUND

In current cellular networks the power saving operation is only defined for a user equipment (UE) such as a wireless handset; the power saving operation is controlled by the network. Timers are used to define discontinuous reception (DRx) cycle lengths used by the UE. Each DRx cycle may include a number of receiving-on periods and a number of receiving-off periods; power supply may be turned off at the handset during a receiving-off period of the DRx cycle.

Traditionally, other network elements such as a base station and an access point do not have power saving mode of operation, in part because they normally have a power supply. This is changing and network elements such as base stations also need power saving operation at least for two reasons. First, a power saving operation may support battery-powered devices such as a laptop computer or a UE to serve as an access point in a local area network environment. Second, as wireless network elements become more prevalent and collectively consume more energy, an efficient power saving operation may help contribute to significant energy saving. For example, meaningful energy saving may be achieved if the access points and base stations in business buildings are put in a power saving mode during weekend or nights when network traffic is considerably light. For the purpose of this application, the network elements such as base station and access points are only distinguished from handset and are not distinguished from each other; the terms may be used interchangeably for the convenience of description.

SUMMARY

Various aspects of examples of the invention are set out in the claims.

According to a first aspect of the present invention, a method comprises determining at a base station an activity level and selecting an availability mode based at least in part on the activity level, wherein the availability mode is one of a full-availability mode, a semi-availability mode and a minimum-availability mode. The method also comprises configuring radio resources for at least the minimum-availability mode and switching to the selected availability mode.

According to a second aspect of the present invention, an apparatus comprises a resource control module configured to determine an activity level and select an availability mode based at least in part on the activity level, wherein the availability mode is one of a full-availability mode, a semi-availability mode and a minimum-availability mode. The resource module is also configured to configure radio resources for at least the minimum-availability mode. The apparatus also comprises a power control module configured to switch to the selected availability mode.

According to a third aspect of the present invention, an apparatus comprises a resource control module configured to configure a beacon scanning interval for a selection or a reselection based at least in part on a current availability mode of an associated base station wherein the availability mode is one of a full-availability mode, a semi-availability mode and a minimum-availability mode. The resource control module is also configured to schedule a measurement report for a handover based at least in part on the current availability mode. The apparatus also comprises a power control module configured to switch to a power saving mode based at least in part on the availability mode of the base station.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1:
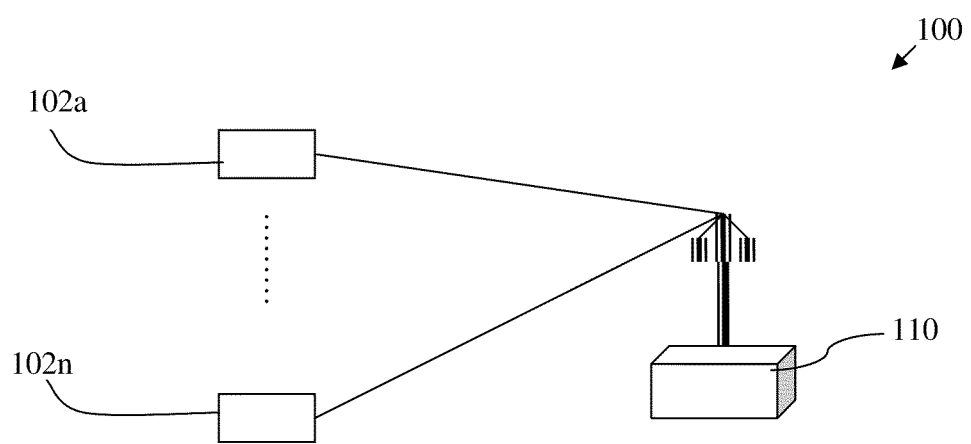
FIG. 1 illustrates an example local area network in accordance with an example embodiment of the invention.
Figure 4:
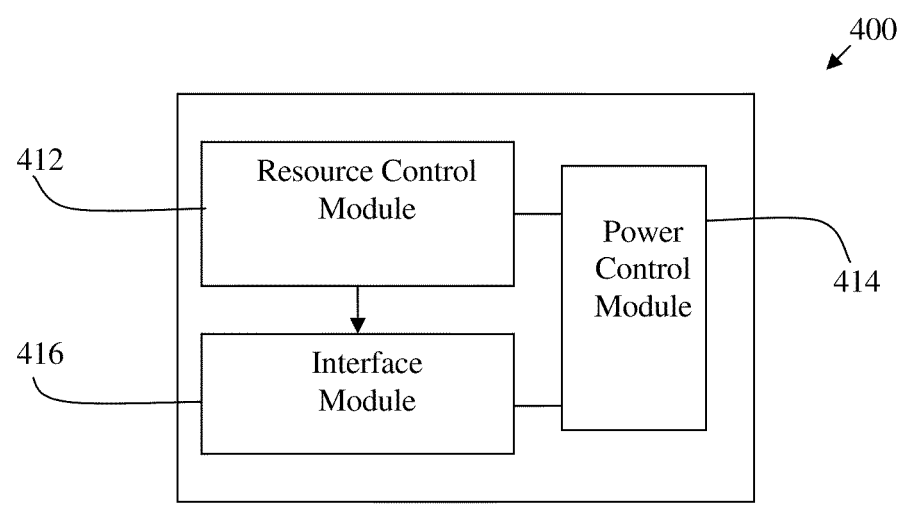
FIG. 4 illustrates an example apparatus for implementing the availability modes in accordance with an example embodiment of the invention.

FIG. 1 illustrates an example wireless local area network 100. The example wireless local area network 100 may include an access point 110, and a number of UEs 102a through 102n. The access point 110 may contain a power saving mode apparatus 400 which is illustrated in FIG. 4 and described hereafter. Each of the UEs 102a through 102n may leave and a new UE may join the wireless local area network 100 at any moment. If the wireless local area network 100 is located in an enterprise business building, the traffic load on the network may be high and dynamic during the day time and may be light during nights or weekends.

In an example embodiment of the wireless local area network 100, the access point 110 monitors an activity level including a number of active UEs currently associated with the access point 110, scheduled traffic load of each active UE, and the like. When the access point 110 detects that the activity level decreases to a threshold point, the access point may decide to switch to a power saving mode, such as a semi-availability mode or a minimum-availability mode. In either the semi-availability mode or the minimum-availability mode, the access point may be available to receive data only for part of a radio frame, rather than the entire radio frame. An active UE, such as the UE 102a, may synchronize its power saving operation with that of the access point 110 and may send data only when the access point 110 is available for receiving data. The access point 110 may wake up from time to time to send broadcast beacon messages and may also change the periodicity of the broadcast beacon message.

Figure 2A:
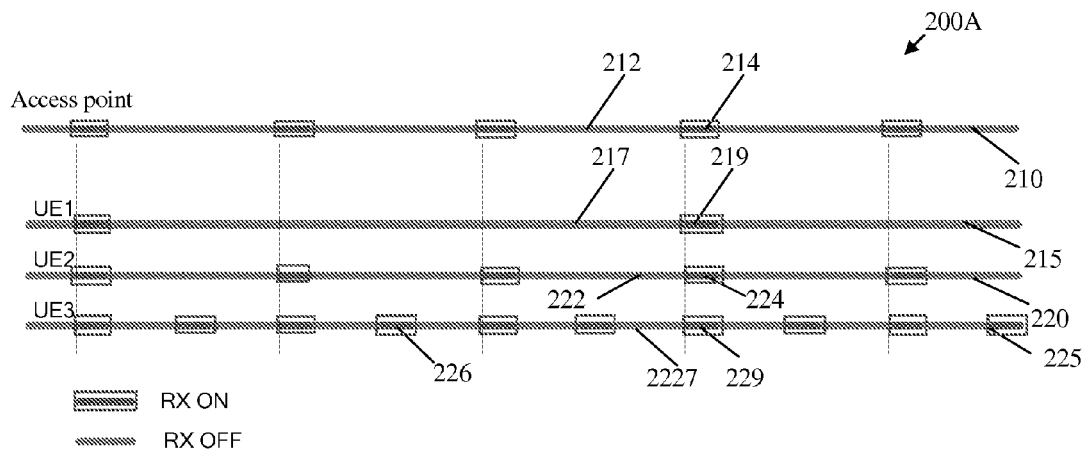
FIG. 2A illustrates example power saving operations of different network elements in accordance with an example embodiment of the invention.

FIG. 2A illustrates example power saving operations 200A in accordance with an example embodiment of the invention. The power saving operations 200A illustrate an example system with an access point and three UEs in a power saving mode. The UEs may know when the access point is receiving data and the access point knows when the UEs are receiving data. During the receiving periods of the access point, the UEs are allowed to send uplink scheduling requests such as long-term-evolution (LTE) type or long-term-evolution-advanced (LTE-A)-compliant type of scheduled uplink transmissions. An LTE-compliant or LTE-A compliant UE may refer to a UE that complies with the current as well as future specifications of LTE standards and LTE-A standards. The discontinuous receiving (DRx) cycles of the UEs and the access point may be synchronized to maximize the power saving for both UEs and the access point. The UEs may have longer DRX cycles than the access points in many cases, but the opposite may also be possible if the service is such that less delay is tolerated for the downlink traffic than for the uplink traffic. The UEs may consider the availability of the access point when they measure the access point for handover and may use the access point receiving-off periods to perform measurements. The access point may indicate its availability mode in broadcast messages so that those UEs in a neighboring cell may take the access point into account while scheduling its handover measurements. The traditional assumption on the continuous availability of the access point may not be valid when the access point is in a power saving mode. UE transmissions may be scheduled only during the times when the access point is available to receive data and this may enable the UEs to save power.

The example power saving operations 200A may include an access point power saving operation 210, a UE1 power saving operation 215, a UE2 power saving operation 220, and UE3 power saving operation 225. The access point power saving operation 210 includes a number of short receiving-on periods such as the receiving-on period 214 and a number of receiving-off or sleep periods such as the receiving-off period 212. The UE1 power saving operation 215 includes a few long receiving-off periods such as the receiving-off period 217 and two short receiving-on periods such as the receiving-on period 219. Similarly, UE2 power saving operation 220 has a few receiving-off periods such as the receiving-off period 222 and a few receiving-on periods such as the receiving-on period 224. The UE3 power saving operation 225 includes a number of receiving-off periods such as the receiving-off period 227 and a number of receiving-on periods such as the receiving-on period 229. Because the access point may send signaling messages to the associated UEs, the UEs may know the receiving-on periods of the access point. Thus the receiving-on periods may be aligned with those of the access points as shown by the receiving periods of 214, 219, 224 and 229. Some UE receiving-on periods such as the receiving-on period 226 of the UE3 power saving operation 225 are not synchronized with those of the access point 210, because the UE3 may be receiving data from a different network element. A UE may have even longer receive-off periods as shown in FIG. 2A. During the receive-on periods it may stay up for several receive-on periods of the access point and then enter the receive-off period again.

Figure 2B:
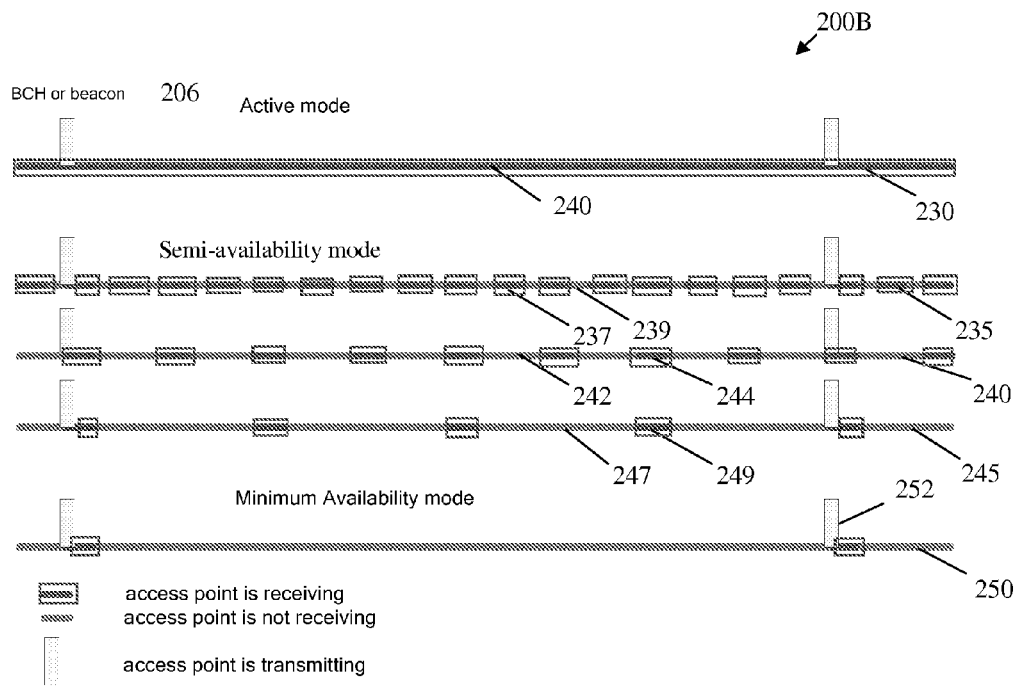
FIG. 2B illustrates example availability modes in accordance with an example embodiment of the invention.

FIG. 2B illustrates example availability modes 200B in accordance with an example embodiment of the invention. FIG. 2B illustrates three example availability modes: a full-availability mode 230, semi-availability modes 235, 240 and 245, and a minimum-availability mode 250. In the full-availability mode 230, the access point may have the receiving-on periods for every frame and may be available for receiving data while it is not transmitting. This mode may be suitable when the network load is high. This is currently the only available mode of operation for network elements such as an access point.

In one example embodiment, the semi-availability mode may be suitable when there are active UEs but the traffic load is low and delay requirements are such that the access point is allowed to sleep from time to time. The semi-availability mode is further divided into the three sub semi-availability modes 235, 240 and 245 to accommodate different levels of activities of the access point. For example, the semi-availability mode 235 has frequent receiving-on periods such as the receiving-on period 237 and short receiving-off periods such as the receiving-off period 239. The semi-availability mode 235 may be suitable when the traffic load is relatively high. In contrast, the semi-availability mode 245 has longer receiving-off or sleep periods such as the receiving-off period 247 and short, infrequent receiving-on periods such as the receiving-on period 249. This semi-availability mode may be suitable for a very light traffic load with high traffic delay tolerance. The semi-availability mode 240 may be suitable for a traffic condition that is modestly high, somewhat in between that for the semi-availability mode 235 and that for the semi-availability mode 245. In this semi-availability mode, the receiving-on periods such as the receiving-on period 244 and the receiving-off periods such as the receiving-off period 242 are almost equally frequent and moderate in length.

In one example embodiment, the access point may also decide which availability mode to select based on the receiving resources needed. For example, if 10% of the overall receiving resources were used by the UEs in the last 100 milliseconds (ms), a semi-availability mode such as the semi-availability mode 240 may be suitable. If less than 5% of the receiving resources were used by the UEs in the last 100 milliseconds, a semi-availability mode such as the semi-availability mode 245 may be suitable. If more than 20% but less than 30% of the receiving resources were used by the UEs, a semi-availability mode such as the semi-availability mode 235 may be suitable. In addition, amount of downlink or uplink traffic may also be considered. For example, if there is a significant amount of downlink traffic, the access point may stay in a semi-availability mode for receiving downlink traffic as well as acknowledgements from the UEs. In another embodiment, the access point may stay in a semi-availability mode even if there is only a single active UE associated with the access point, to enable a fast network response when the UE starts a session.

The minimum availability mode 250 may be suitable for situations where there are none or a small number of active UEs that have long DRx cycles and largely in idle mode. Then the access point may be available for receiving data for a short time period after it wakes up for broadcast channel or beacon transmission such as the transmission period 252. In the minimum-availability mode 250, the access point may be available for receiving some frames after transmitting a beacon or broadcast message. In some example embodiments, the minimum-availability mode 250 may also be suitable when the access point only listens and does not transmit any beacon message. The access point may have the opportunity to enter a receiving-off period during rest of the DRx cycle. The duration between the beacon signals may be configurable for the minimum-availability mode or semi-availability mode. During the receiving-on period, there may be uplink resources available for UEs to send scheduling requests or scheduled uplink transmission. The power saving mode of the access point, such as the minimum-availability mode or the semi-availability mode, may not limit the time when the access point may transmit to UEs that have not set their DRx cycles or that are in a DRx receiving-on period. Hence the access point may interrupt its inactive timer and immediately deliver data packets to these UEs as soon as they arrive. The decision by the access point to immediately deliver such data packets may depend on the amount of data packets arriving for the UEs in a DRx receiving-on period.

Figure 2C:
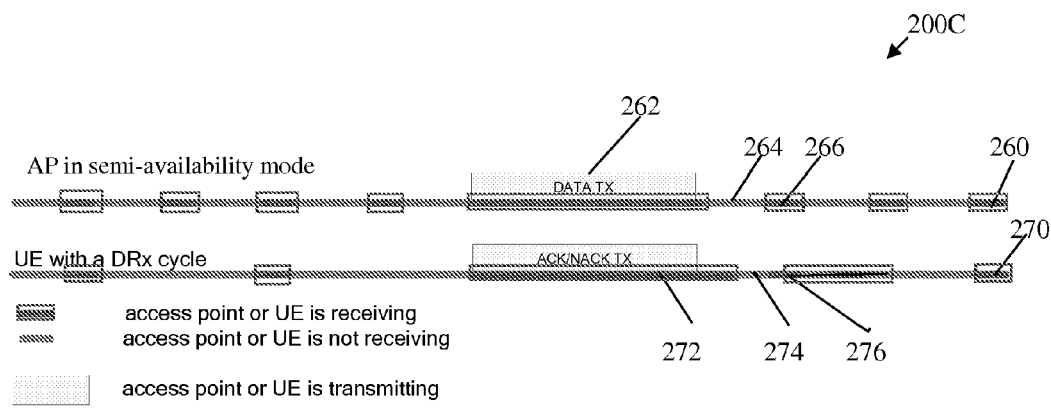
FIG. 2C illustrates an example semi-availability mode in accordance with an example embodiment of the invention.

FIG. 2C illustrates an example semi-availability mode 200C in accordance with an example embodiment of the invention. The example semi-availability mode 200C illustrates an access point in a semi-availability mode 260 and a UE in a semi-availability mode 270. The access point may initiate a downlink transmission or allocate resources for uplink transmissions in the semi-availability mode. When there is data ready to be transmitted, the access point may move to a mode of continuous activity and resuming the semi-availability mode after the data transmission. For example, the access point may enter the data transmission period 262, then goes into the receiving-off period 264 and then goes into the receiving-on period 266. Similarly, the UE may enter the data transmission period 272 to transmit an acknowledge (ACK) or negative acknowledgement (NACK). Then the UE may go into a short receiving-off period 274 and then a short receiving-on period 276. In some embodiment, the access point may signal the UE to keep it in the full-availability mode to receive data by extending the current DRx receive-on period. For example, the signaling may include an "end of data" bit which is set to "not end of data." The access point may also have the option to move to continuous activity or shorter DRx cycle and may not need signal the change to the UE. The access point may be available when an UE expects it to be available. This may be achieved by configuring DRx cycles of the UE and the DRx cycle of the access point in such a way that the periodicities of the DRx cycles are multiples of each other.

Figure 3A:
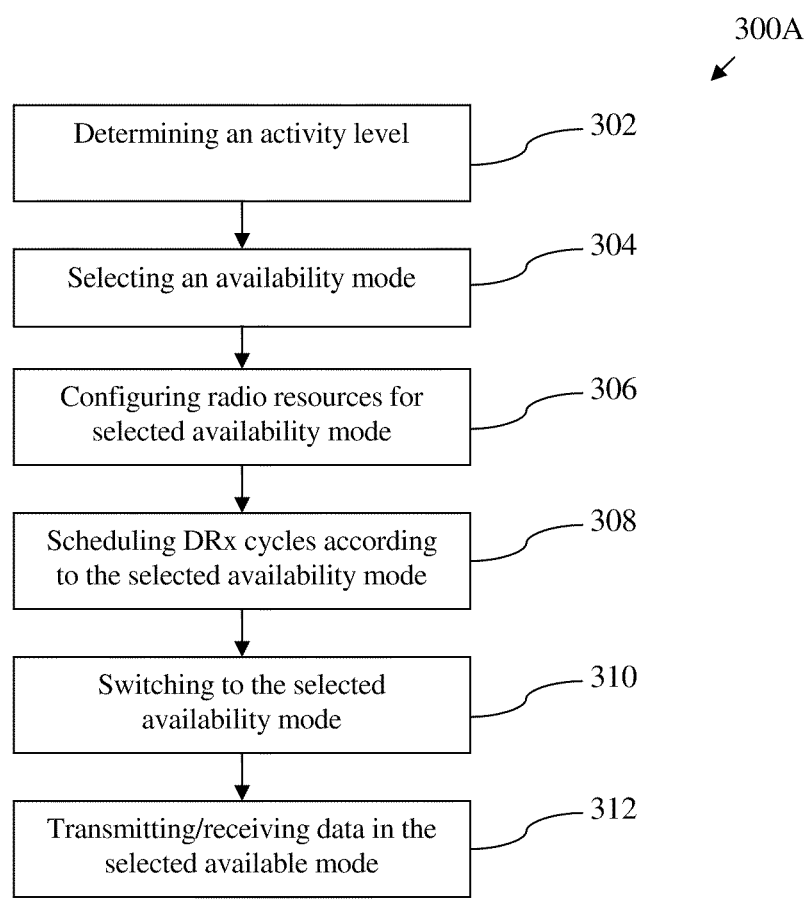
FIG. 3A illustrates an example method for operations of availability modes in accordance with an example embodiment of the invention.

FIG. 3A illustrate an example method 300A for operations of various availability modes in accordance with an example embodiment of the invention. The method 300A may include determining an activity level at block 302, selecting an availability mode at block 304 and configuring radio resources if there is a need for the selected availability mode at block 306. The method 300A may also include scheduling DRx cycles of the access point and the associated UEs according to the selected availability mode at block 308, switching to the selected availability mode at block 310 and transmitting and receiving data according to the selected available mode at block 312.

In one example embodiment, determining the activity level at block 302 may include determining an overall activity level based on a plurality of factors. The factors may include a number of active UEs associated with the access point, a current cell-wide traffic load, a scheduled cell-wide traffic load, a type of power source, lengths of DRx cycles requested by the active UEs and the like. The criteria may also include a delay requirement of the active UE, an interference level of the neighboring network elements, and historical traffic pattern for a given time and day. The type of power source may be a battery power source, an alternate current power source or a mixed power source. The cell-wide traffic load may include scheduled amount of transmission data and receiving data, an interference level from a neighbor access point and the like.

In one example embodiment, selecting an availability mode at 304 may include selecting one of the availability modes based on the determined activity level. The availability modes include a full-availability mode, a semi-availability mode and a minimum available mode. The semi-availability mode may be further divided in different levels of semi-availability modes. In one example embodiment, the semi-availability mode indicates that the apparatus is available for receiving data for part of a radio frame such as a quarter-radio-frame, a half-radio-frame, or a 3-quarter-radio-frame.

Figure 3B:
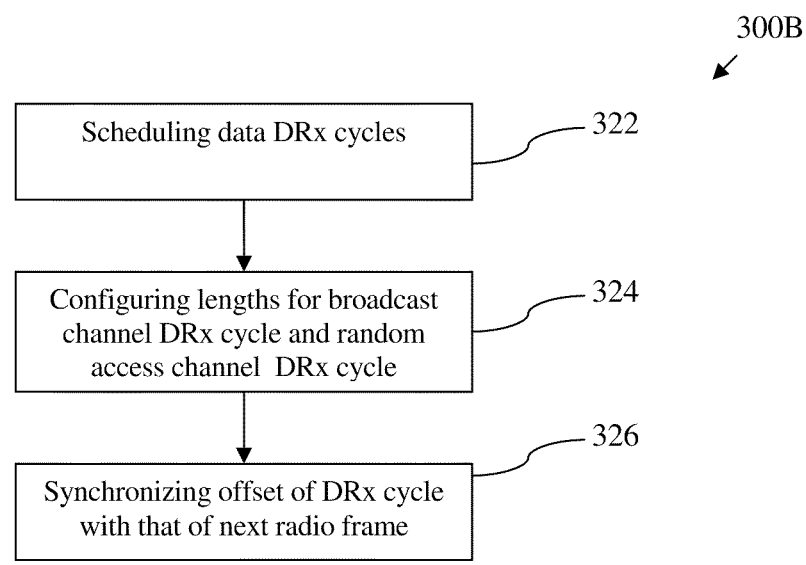
FIG. 3B illustrates an example method for scheduling discontinuous receiving cycles.
Figure 3C:
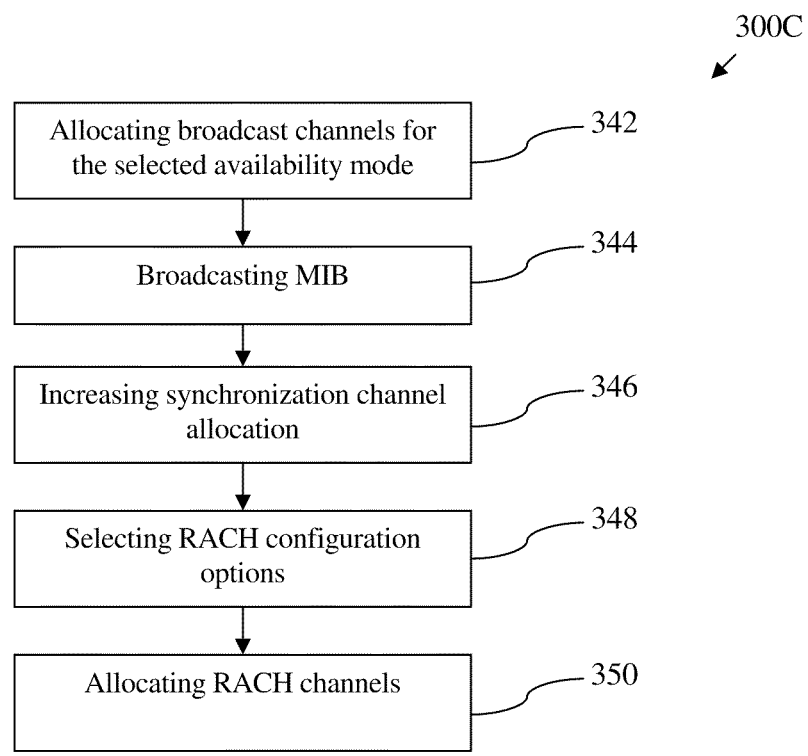
FIG. 3C illustrates an example method for configuring radio resources in accordance with an example embodiment of the invention.

In one example embodiment, configuring radio resources for the selected availability mode at block 306 may include configuring radio resources for power saving mode such as the minimum-availability mode. Details of configuring radio resource are illustrated in FIG. 3C and described hereafter. Scheduling DRx cycles according to the selected availability mode at block 308 may include scheduling the DRx cycles for both the access point and the associated UEs to operate more efficiently in a power saving mode. Details of scheduling DRx cycles are illustrated in FIG. 3B and described hereafter.

In one example embodiment, switching to the selected availability mode 310 may include switching to a lesser availability mode than the current availability mode and signaling each of the active UEs of the selected availability mode. Signaling the active UE of the selected availability mode may include sending to the active UE one of a unicast signaling message and a broadcast signaling message that includes at least an indicator for the selected availability mode. For the unicast message, the access point may receive an acknowledgement. There may not be any acknowledgement for a broadcast message if the signaling message is received successfully by the UE although an acknowledgement to the broadcast message may be implemented in some example embodiment. Switching to the selected availability mode may also include switching off power supply to some components of the access point, the components such as a digital processing module in the semi-availability mode. Switching to the minimum-availability mode may include switching off power supply to both digital component and analog processing component of the access point. In some example embodiment, switching to the semi-availability mode may also include switch off power supply to the analog processing components. Different implementations of power saving operation may be possible depending on a variety of factors such as amount of energy consumed by switching on/off the processing modules, amount of energy consumed in an operating state and amount of energy saved in each availability mode.

In one example embodiment, transmitting/receiving data in the selected available mode at block 312 may include suspending the power saving mode, transmitting data to at least one active UE when data is ready for transmission such and resuming the current power saving mode after transmitting the data. Receiving data include receiving data from the UEs or other network elements during a scheduled DRx cycle.

In an example embodiment, the method 300A may be implemented in the access point 110 of FIG. 1 or in the apparatus 400 of FIG. 4. The method 300A is for illustration only and the steps of the method 300 may be combined, divided, or arranged in a different order than illustrated, without departing from the scope of the invention of this example embodiment.

FIG. 3B illustrates an example method 300B for scheduling DRx cycles. The method 300B may include scheduling DRx cycles for active UEs at block 322, configuring lengths of DRx cycles at block 324, and synchronizing offset of DRx cycle with that of next radio frame at block 326.

In one example embodiment, scheduling DRx cycles at block 322 may include scheduling DRx cycles for the access point and the associated active UEs according to the selected availability mode. For example, if the selected availability mode is a semi-availability mode as shown in FIG. 2B, the DRx cycles for the access point may be configured based on the overall activity level. If the activity-level is moderate, the access point DRx cycles may be moderate in length. The lengths of both receiving-off period and receiving-on period may be moderate such as those in the semi-availability mode 245 of FIG. 2B. On the other hand, if the activity level is relatively high, the DRx cycle may be scheduled to be more frequent with shorter and more frequent receiving-on and receiving-off periods such as those in the semi-availability mode 235 of FIG. 2B.

In one example embodiment, configuring DRx cycle length at block 324 may include configuring regular DRx cycle or PBCH cycles based on the traffic characteristics. For example, if the UEs in the cell tend to move around frequently and may need receive PBCH message such as primary information block promptly, the receiving-on periods of PBCH DRx cycles of the access point may be configured to be more frequent or longer to facilitate an active UE handover with minimum delay. For another example, if the traffic load in neighboring access points is high, the receiving-on periods of DRx cycles of the access point may also be configured to be more frequent or longer to receive incoming handovers.

In one example embodiment, synchronizing the DRx receive-on periods with that of next radio frame at block 326 may include aligning one or more offsets of DRx receive-on periods of the active UEs with the DRx receive-on periods of the access point to achieve efficient communications between the UEs and the access point in the selected power saving mode. Synchronizing offset of DRx cycles may also include signaling offsets when the next DRx receive-on period starts relative to a frame number to the active UEs. In cases where the access point is more active than the UEs and there are multiple active UEs, it may be beneficial to coordinate the DRx receive-on periods of the UEs to be distributed over the receiving-on periods of the access point.

FIG. 3C illustrates an example method 300C for configuring radio resources in accordance with an example embodiment of the invention. The method 300C may include allocating broadcast channels at block 342, broadcasting main information block at block 344 and increasing synchronization channel allocation at block 346. The method 300C may include selecting a random access channel (RACH) configuration at block 348 and allocating random access channels at block 350.

In one example embodiment, allocating broadcast channels at block 342 may include allocating primary broadcast channels (PBCH) and secondary broadcast channels for the minimum-availability mode. Allocating the primary broadcast channel may include consolidating primary broadcast channels over multiple radio frames into a single radio frame to accommodate a power saving mode such as the minimum-availability mode. In one embodiment of the minimum availability mode, the primary broadcast channel is repeated in four locations of a single radio frame during a transmission time interval (TTI) while the regular broadcast channel in an LTE network is repeated in intervals of a fixed number of milliseconds (ms) over four consecutive radio frames. Receiving multiple copies of the message may increase fault tolerance in a lesser availability mode even in a less reliable network environment. This condensed PBCH allocation may save a UE from waiting for 4×250 milliseconds (ms) if the broadcast interval is set to 250 ms in order to get multiple copies of the beacon message in the minimum-availability mode. In one example embodiment of LTE implementation, the primary broadcast channel may be mapped to 72 center sub-carriers of orthogonal frequency division multiplexing (OFDM) symbols #3 and #4 of the first slot and #0 and #1 of the second slot of a radio frame. In addition the primary broadcast channel may occupy 3×72 sub-carriers at other locations in the first and second slot of the same radio frame.

In one example embodiment, broadcasting main information block (MIB) at block 344 may include using the primary broadcast channel to send the main information block and other system information in one radio frame rather than over multiple radio frames. This may avoid having the MIB information and additional system information spread over separate radio frame and having an active UE wait for substantial amount of time to receive an entire main information block in a power saving mode.

In one example embodiment, increasing synchronization channel allocation at block 346 may include doubling the synchronization channel power allocation in the transmitted frames if synchronization channel is not transmitted in every frame because the access point is in a lesser availability mode. This may help maintain low synchronization delay if UE channel condition necessitates averaging of synchronization signals over multiple frames.

In one embodiment, selecting a random access channel (RACH) configuration option at block 348 may include selecting a random access channel configuration that has a maximum number of RACH locations for the minimum-availability mode or semi-availability mode. The maximum number of RACH locations may enable the associated active UEs to avoid situations where there are not sufficient RACH resources available to send a resource request while the access point is in the minimum-availability mode.

In another embodiment, allocating random access channels at block 350 may include automatically configuring a random access channel in each radio frame when the access point is available. For example, a random access channel may be configured every fifth sub-frame for the semi-availability mode where the access point is available every fifth sub-frame. This may result in fast response times for UEs that desires to access the network in a timely manner. It may be desirable to assign more resources to the random access channel when the network element is in a power saving mode such as the semi-availability mode or the minimum-availability mode and the current network load is relatively low.

FIG. 4 illustrate an example apparatus 400 for implementing the availability modes in accordance with an example embodiment of the invention. The apparatus 400 may include a resource control module 412, a power control module 414, and an interface module 416.

In one example embodiment, the resource control module 412 may determine an activity level and select an availability mode based at least in part on the activity level. The availability mode may be one of a full-availability mode, a semi-availability mode and a minimum-availability mode. The resource control module 412 may also configure radio resources at least for the minimum-availability mode.

In one example embodiment, the resource control module 412 may allocate a plurality of LTE primary broadcast channels in one radio frame rather than in multiple consecutive radio frames, in order for an associated active UE to avoid waiting for a long period of time to receive important information such as a complete main information block. The resource control module 412 may broadcast LTE main information blocks in the allocated primary broadcast channels and increase substantially synchronization channel allocations in a radio frame to achieve a faster synchronization. The resource control module 412 may also select at least one LTE RACH configuration that maximizes RACH allocations. The resource control module 412 may allocate at least one random access channel in each radio frame when the access point is available and increase substantially RACH allocations in the radio frame.

The resource control module 412 may also configure DRx cycles for the associated active UEs upon request and for the network element itself. The DRx cycles may be scheduled in such a way that the DRx cycles are evenly distributed over radio frames to achieve an even traffic distribution. The resource control module 412 may also synchronize an offset of each of the DRx cycle with an offset of a next radio frame after signaling the active UE via a unicast or a broadcast signaling message of the cycle length and the offset of scheduled the DRx cycle. The resource control module 412 may configure a length of a PBCH DRx cycle and a length of a RACH DRx cycle in such a way that the PBCH DRx cycle and the RACH DRx cycle are multiples of the DRx cycles of the active UE for an efficient resource utilization.

In one example embodiment, the power control module 414 may switch to the selected availability mode from the current availability mode. The power control module 414 may also cause to transmit beacon signals in a power saving mode while the interval between the beacon signals may be configurable. The power control module 414 may also cause to transmit a resource allocation map, which includes a 3-bit availability mode field indicating the full-availability mode, the minimum-availability mode and the semi-availability mode. The resource allocation map may be part of the main information block contained in a broadcast message. The semi-availability mode may further be divided into an every-other-subframe semi-availability mode, an every-fifth-subframe semi-availability mode, and an every-tenth-subframe semi-availability mode.

In one example embodiment, the interface module 416 may include at least one transceiver and may in collaboration with the resource control module 412 and the power control module 414 send signaling messages to one or more active UEs. The signaling message may include at least an indicator of the selected availability mode. The apparatus 400 may be part of a LTE base station, a LTE-compliant access point or other $4^{th}$ generation wireless network element. The apparatus 400 may cause an implementation of the method 300 as shown in FIG. 3.

Figure 5:
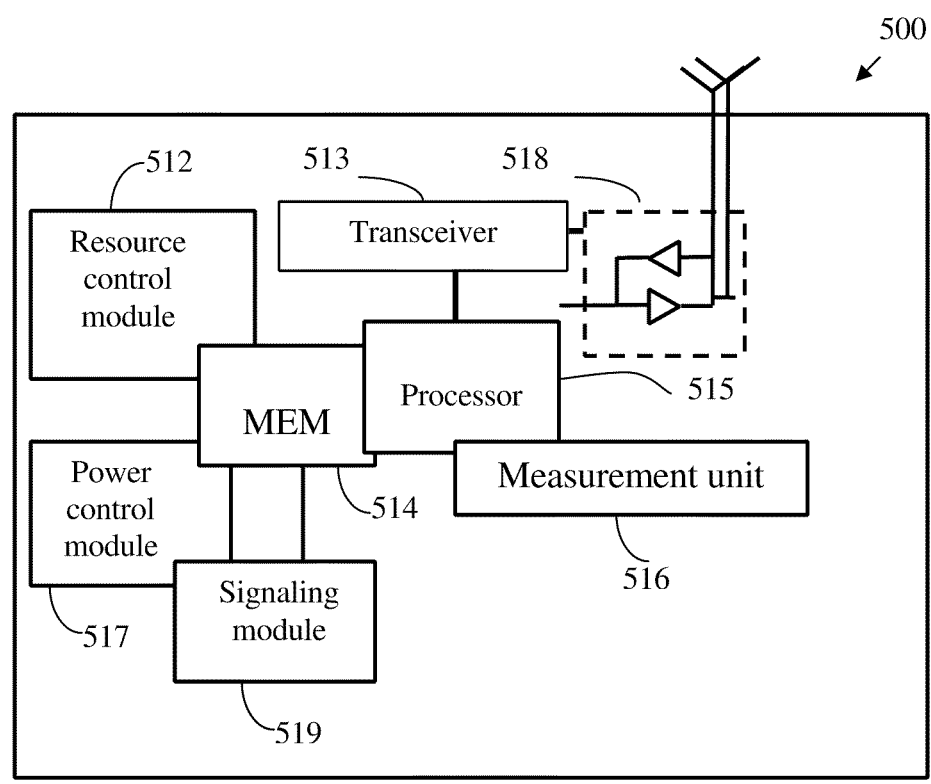
FIG. 5 illustrates an example wireless apparatus for implementing the availability modes in accordance with an example embodiment of the invention.

FIG. 5 is a block diagram illustrating an example wireless apparatus 500 for implementing the availability modes in accordance with an example embodiment of the invention. In FIG. 5, the wireless apparatus 500 may include a processor 515, a memory 514 coupled to the processor 515, and a suitable transceiver 513 (having a transmitter (TX) and a receiver (RX)) coupled to the processor 515, coupled to an antenna unit 518. The memory 514 may store programs such as a resource control module 512, a power control module 517 and a signaling module 519. The wireless apparatus 500 may be at least part of a $4^{th}$ generation mobile station, a LTE compliant mobile station and a LTE compliant base station.

The processor 515 or some other form of generic central processing unit (CPU) or special-purpose processor such as digital signal processor (DSP), may operate to control the various components of the wireless apparatus 500 in accordance with embedded software or firmware stored in memory 514 or stored in memory contained within the processor 515 itself. In addition to the embedded software or firmware, the processor 515 may execute other applications or application modules stored in the memory 514 or made available via wireless network communications. The application software may comprise a compiled set of machine-readable instructions that configures the processor 515 to provide the desired functionality, or the application software may be high-level software instructions to be processed by an interpreter or compiler to indirectly configure the processor 515.

In an example embodiment, the resource control module 512 may configure a beacon scanning duration for a selection or a reselection based at least in part on an availability mode of an associated base station or access point. For example, if the associated base station is in the minimum-availability mode, the scanning duration may be longer to receive a broadcast message from the base station. In addition, the resource control module 512 may also schedule measurement reports for a handover based at least in part on the availability mode. For example, if the base station is in a semi-availability mode, it may need to synchronize its transmission time with the DRx receiving cycle so the base station is available to receive the measurement reports. The resource control module 512 may schedule an uplink transmission when the associated base station is available for receiving data based on the availability mode and the traffic map received from the base station.

The resource control module 512 may configure the interval between two beacon transmissions and the interval between two random access channel transmissions based at least in part on the availability mode of the base station. The resource control module 512 may schedule a downlink reception based at least in part on the availability mode and the traffic map received from the base station. The downlink reception may span over one receiving-on period or multiple receiving-on periods. The resource control module 512 may decide a length of a DRx cycle based at least in part on a delay tolerance level for uplink traffic and a delay tolerance level for a downlink traffic.

In an example embodiment, the power control module 517 is configured to switch to a power saving mode based at least in part on the availability mode of the base station and to synchronize the power saving mode with the availability mode of the associated base station. In an example embodiment, the signaling module 519 may receive a beacon signaling message that includes an indicator of the availability mode of the base station and a traffic map that includes transmission times of the base station and DRx cycles. In another example embodiment, the traffic map may also include offset information for the semi-availability mode. For example, although access points may have a fixed location such as subframe 0 to transmit the primary broadcast channels, for some semi-availability mode, every $2^{nd}$ subframe may have an offset of 0 or 1 subframes. Similarly for some other semi-availability mode, every fourth frame may have an offset of 0, 1, 2 or 3 subframes. Thus, the traffic map may indicate precisely an offset subframe.

The transceiver 513 is for bidirectional wireless communications with another wireless device. The transceiver 513 may provide frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to some analog baseband processing unit and/or the processor 515 or other central processing unit. In some embodiments, the transceiver 513, portions of the antenna unit 518, and an analog baseband processing unit may be combined in one or more processing units and/or application specific integrated circuits (ASICs).

The antenna unit 518 may be provided to convert between wireless signals and electrical signals, enabling the wireless apparatus 500 to send and receive information from a cellular network or some other available wireless communications network or from a peer wireless device. In an embodiment, the antenna unit 518 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 518 may include antenna tuning and/or impedance matching components, RF power amplifiers, and/or low noise amplifiers.

As shown in FIG. 5, the wireless apparatus 500 may further include a measurement unit 516, which measures the signal strength level that is received from another wireless device, and compare the measurements with a configured threshold. The measurement unit may be utilized by the wireless apparatus 500 in conjunction with various exemplary embodiments of the invention, as described herein.

In general, the various exemplary embodiments of the wireless apparatus 500 may include, but are not limited to, part of a user equipment, or a wireless device such as a portable computer having wireless communication capabilities, Internet appliances permitting wireless Internet access and browsing, as well as portable units or terminals that incorporate combinations of such functions. In one embodiment, the wireless apparatus 500 may be implemented in one of the UEs 102a through 102n of FIG. 1.

Without in any way limiting the scope, interpretation, or application of the claims appearing below, a technical effect of one or more of the example embodiments disclosed herein is to enable power save operation for network element such as access points or base station which normally do not have any power saving mode. Another technical effect of one or more of the example embodiments disclosed herein is a potential energy saving from ever prevalent wireless network elements.

Embodiments of the present invention may be implemented in software, hardware, application logic or a combination of software, hardware and application logic. The software, application logic and/or hardware may reside on a user equipment, a base station or an access point. If desired, part of the software, application logic and/or hardware may reside on access point, part of the software, application logic and/or hardware may reside on a network element such as a UE, and part of the software, application logic and/or hardware may reside on a peer network element such as a base station or an access point. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 5. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
    determining at a base station an activity level in a current radio frame;
    selecting, by the base station, an availability mode for the base station based at least in part on the activity level, wherein the availability mode is one of a full-availability mode, a semi-availability mode and a minimum-availability mode, wherein each of the full-availability mode, semi-availability mode and minimum-availability mode is defined by different numbers of receiving-on periods, within a beacon interval, of the base station;
    configuring radio resources for and the selected availability mode;
    scheduling discontinuous reception (DRx) cycles for the selected availability mode;
    switching to the selected availability mode and indicating the selected availability mode to a plurality of active user equipments (UEs); and
    transmitting and receiving data in the selected availability mode,
    wherein the full-availability mode has a higher number of receive-on periods than the semi-availability mode, and is selected when at least the activity level is higher than a maximum activity level defined to be supported by the semi-availability mode, wherein the minimum-availability mode has a lower number of receive-on periods than the semi-availability mode, and is selected when at least the activity level is lower than a minimum activity level defined to be supported by the semi-availability mode,
    wherein the configuring radio resources comprises allocating primary broadcast channels (PBCHs) for the selected availability mode by consolidating the PBCHs over multiple radio frames into a single radio frame, increasing power of synchronization channel in the single radio frame, and selecting maximum available number of random access channel (RACH) locations, wherein the scheduling DRx cycles for the selected availability mode comprises synchronizing receive-on periods of the DRx cycles of the base station in the current radio frame with the receive-on period of a radio frame next in time to the current radio frame by signaling offsets to active UEs associated with the base station, and wherein the selection of the availability mode is further based on an amount of receiving resources needed.

2. A method of claim 1 wherein determining the activity level further comprises determining the activity level based on lengths of DRx cycles requested by at least one active UE.

3. A method of claim 1 wherein switching to the selected availability mode further comprises switching to a lesser availability mode and signaling each of the active UEs on the selected availability mode by sending to the active UE one of a unicast signaling message and a broadcast signaling message that includes at least an indicator of the selected availability mode, wherein in the lesser availability mode the base station is less available than a current availability mode.

4. A method of claim 3 wherein switching to the semi-availability mode further comprises switching off power supply to a plurality of components of the base station during the receiving-off period, the plurality of components including a digital processing module; and wherein switching to the minimum-availability mode comprises switching off power supply to a second plurality of components of the base station during the receiving-off period, the second plurality of components including the digital processing module and at least an analog processing module.

5. A method of claim 1, wherein scheduling the DRx cycles for one of the full-availability mode and the semi-availability mode, further comprises at least one of scheduling for each of active UEs a plurality of DRx cycles in such way that the DRx cycles are evenly distributed over radio frames to achieve an even traffic distribution;

configuring at least one of a length of a PBCH DRx cycle, a periodicity of the PBCH DRx, a length of RACH DRx cycle and a periodicity of RACH DRx cycle in such a way that the PBCH DRx cycle and the RACH DRx cycle are multiples of the DRx cycles for the active UE.

6. A method of claim 1, further comprising:

transmitting data to at least one active UE when data is ready for transmission; and resuming a current availability mode after transmitting the data.

7. An apparatus, comprising:

a base station configured to determine an activity level in a current radio frame;

select an availability mode, for the apparatus, based at least in part on the activity level, wherein the availability mode is one of a full-availability mode, a semi-availability mode and a minimum-availability mode, wherein each of the full-availability mode, semi-availability mode and minimum-availability mode is defined by different numbers of receiving-on periods, within a beacon interval, of a base station;

configure radio resources for the selected availability mode;

schedule discontinuous reception (DRx) cycles for the selected availability mode;

switch to the selected availability mode; and indicate the selected availability mode to a plurality of user equipments (UEs); and transmit and receive data in the selected availability mode, wherein the full-availability mode has a higher number of receive-on periods than the semi-availability mode, and is selected when at least the activity level is higher than a maximum activity level defined to be supported by the semi-availability mode, wherein the minimum-availability mode has a lower number of receive-on periods than the semi-availability mode, and is selected when at least the activity level is lower than a minimum activity level defined to be supported by the semi-availability mode, wherein the configuring radio resources comprises allocating primary broadcast channels (PBCHs) for the selected availability mode by consolidating the PBCHs over multiple radio frames into a single radio frame, increasing power of synchronization channel in the single radio frame, and selecting maximum available number of random access channel (RACH) locations, wherein the scheduling DRx cycles for the selected availability mode comprises synchronizing receive-on periods of the DRx cycles of the base station in the current radio frame with the receive-on period of a radio frame next in time to the current radio frame by signaling offsets to active UEs associated with the base station, and wherein the selection of the availability mode is further based on an amount of receiving resources needed.

8. An apparatus of claim 7 wherein scheduling the DRx cycles for one of the full-availability mode and the semi-availability mode further comprises performing at least one of scheduling for each of the active UEs a plurality of DRx cycles in such way that the DRx cycles are evenly distributed over radio frames to achieve an even traffic distribution;

configuring a length of PBCH DRx cycle and a length of a RACH DRx cycle in such a way that the PBCH DRx cycle and the RACH DRx cycle are multiples of the DRx cycles of the active UE.

9. An apparatus of claim 7 wherein the full-availability mode indicates that the apparatus is available for receiving data for an entire radio frame;

the semi-availability mode indicates that the apparatus is available for receiving data for part of the radio frame; and the minimum-availability mode indicates that the apparatus is available for receiving data for a minimum part of the radio frame.

10. An apparatus of claim 7, wherein the power control module is further configured to cause to transmit beacon signals in the minimum-availability mode wherein an interval between the beacon signals is configurable; and transmit a resource allocation map that includes the selected availability mode, wherein the resource allocation map is part of the main information block.

11. An apparatus of claim 7 wherein the activity level is determined based at least in part on one of the number of active UEs, a current cell-wide traffic load, a scheduled cell-wide traffic load, a type of power source, lengths of DRx cycles requested by the active UEs, a delay requirement of the active UE, and an amount of resource used by the UEs; and wherein the apparatus is one of a base station, and a LTE-compatible access point.

12. A method of claim 2 wherein determining the activity level further comprises determining the activity level based on the number of active user equipments (UEs) associated with the base station.

* * * * *